United States Patent Office 3,450,737
Patented June 17, 1969

3,450,737
PREPARATION OF ALKENYLOXYSILANES
Yves Colleuille, Lyon, France, assignor to Rhone-Poulenc S.A., Paris, France, a French body corporate
No Drawing. Filed Oct. 23, 1965, Ser. No. 504,191
Claims priority, application France, Oct. 28, 1964, 993,004
Int. Cl. C07f 7/18
U.S. Cl. 260—448.8   9 Claims

ABSTRACT OF THE DISCLOSURE

Vinyloxysilanes are made by reacting a compound containing a silicon-hydrogen bond with an olefin in which a hydrogen atom is directly bonded to an olefinically double bonded carbon atom and with carbon monoxide, preferably at elevated temperature and pressure in the presence of hydrogen, using, as catalyst, a Group VIII metal carbonyl.

---

This invention relates to the preparation of 1-alkenyloxysilanes, and in particular to the preparation of organosilicon compounds containing a grouping of formula:

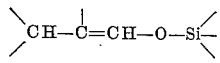

e.g. 1-alkenyloxytrialkylsilanes, 1-alkenyloxytricycloalkylsilanes and 1-alkenyloxytriarylsilanes, carrying at least one hydrogen atom on each of the 1- and 3- atoms of the alkenyloxy radical.

It is known to prepare alkenyloxysilanes using carbonyl compounds or their metal derivatives and hydrogenosilanes or halogenosilanes as starting materials. For example it has been proposed to prepare 1-alkenyloxysilanes by reaction of $\alpha,\beta$-ethylenic aldehydes or ketones with hydrogenosilanes in the presence of chloroplatinic acid [Petrov et al., Bull. Soc. Chim. Fr., 1959, 1932–1933; id., Ivz. Akad. Nauk, 1958, 954–963; Sadykh-Zade et al., Proc. Acad. Sci. U.S.S.R., 121, 523 (1958); id., Zhur. Obshchei. Khim., 29, 3194–3198 (1959)].

It has also been proposed to prepare alkenyloxysilanes by dehydrocondensation of acetone with triethylsilane in the presence of alkali metals [Kharitonov et al., Khim. i Prakt. Primeneme Kremneorg. Soedinii, No. 1, 217–220 (1958)]. However, Nesmeyanov (Proc. Acad. Sci. U.S.S.R., 128, 785 (1959)) has shown that the product obtained by Kharitonov et al. was not the expected alkenyloxysilane.

1-alkenyloxysilanes can also be prepared by reacting halogenosilanes with alkali metal enolates [Kruger et al., J. Organom. Chem., 1, 476 (1964)] or with mercuric derivatives of aldehydes or ketones (Nesmeyanov et al., loc. cit.

According to the present invention vinyloxysilanes comprising the grouping of formula:

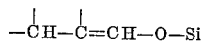

are prepared by reacting a compound containing a silicon-hydrogen bond with an olefin in which a hydrogen atom is bonded directly to an olefinically double bonded carbon atom and with carbon monoxide in the presence of, as catalyst, a carbonyl of a metal of Group VIII of the Periodic Table, or a compound convertible thereto under the conditions of the reaction. The starting materials must, of course, be free from substituents which interfere with the reaction, which is carried out with heating and under pressure.

The reaction involved can be represented by the following diagram:

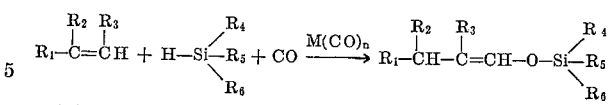

The starting material may be any compound containing an olefinic double bond and at least one hydrogen atom connected to one of the carbon atoms involved in the said bond. These compounds may be hydrocarbon compounds or compounds containing functional groupings, provided that, under the working conditions, these groupings do not interfere with the desired reaction. In the formula given above $R_1$, $R_2$ and $R_3$ may be the same or different and may each represent a hydrogen atom, or a hydrocarbon radical which is preferably saturated, but may also carry another carbon-carbon double bond capable of reacting with the carbon monoxide and a silane as indicated above, or an aromatic radical. These various radicals may contain various substituents which are incapable of disturbing the desired reaction and do not, or practically do not, cause any side reactions. Two of the radicals $R_1$, $R_2$ and $R_3$ may in addition together form a substituted or unsubstituted divalent radical, such as polymethylene or alkenylene, and the olefinic starting material may also be polycyclic. More especially, $R_1$, $R_2$ and $R_3$ may represent alkyl radicals, especially alkyl radicals of 1 to 6 carbon atoms, cycloalkyl radicals, especially cyclopentyl or cyclohexyl, aryl radicals, especially phenyl or phenyl substituted by alkyl radicals of 1 to 6 carbon atoms or by functional groups or atoms which are incapable of interfering with the reaction or aralkyl radicals, especially phenylalkyl radicals. When two of the radicals $R_1$, $R_2$ and $R_3$ together form a divalent radical, the ring so formed generally contains 5 to 8 carbon atoms.

It is generally preferred that $R_1$, $R_2$ and $R_3$ are the same or different and each represents hydrogen, alkyl of 1 to 6 carbon atoms, cycloalkyl of 5 to 6 carbon atoms, or phenyl, or $R_1$ is as aforesaid and $R_2$ and $R_3$ together represent a polymethylene chain of 3 or 4 carbon atoms.

Specific olefinic compounds which include simple $\alpha$-olefins, e.g. ethylene, propylene, 1-butene, and 1-pentene, branched olefins, e.g. isobutene and diisobutylene, cyclo-olefins, e.g. cyclohexene, methylcyclohexene, cyclooctene and norbornylene, aromatic vinyl or alkenyl compounds, e.g. styrene, allylbenzene, and vinyltoluene, and substituted olefins, e.g. vinyl chloride.

The starting material containing a silicon-hydrogen bond may be any compound which contains no radicals able to disturb the desired reaction or leading to side reactions of any material extent. In the above formula $R_4$, $R_5$ and $R_6$ can be the same or different and each represent alkyl, cycloalkyl, aryl, alkaryl or aralkyl radicals which may optionally be substituted, for example as specified above for $R_1$, $R_2$ and $R_3$. The radicals $R_4$, $R_5$ and $R_6$ can also represent functional radicals such as alkoxy, particularly alkoxy of 1 to 6 carbon atoms, cycloalkoxy, aryloxy particularly phenoxy and alkylphenyloxy, and aralkyloxy. It is also possible to use in the process organosilicon compounds in which one or more of the symbols $R_4$, $R_5$ and $R_6$ represent a hydrogen atom or organosilyl or organosilyloxy radicals or even monovalent organic radicals substituted by one or more organosilyl radicals, each optionally comprising one or more silicon-hydrogen bonds.

Generally speaking, the more valuable starting materials for use in the new process are those in which each of $R_4$, $R_5$ and $R_6$ represents hydrogen, alkyl of 1 to 6 carbon atoms, or phenyl.

Specifically starting materials containing a silicon-hydrogen bond include: monosilanes, such as trimethylsilane, triethylsilane, trimethoxysilane, triethoxysilane, triphenylsilane, diphenylsilane, dimethylphenylsilane, and methyldimethoxysilane; disilanes such as pentamethyl disilane; siloxanes, such as 1,1,3,3-tetramethyl disiloxane, and 1,1,3,3-tetraethyl disiloxane; and bis(silyl)-alkanes, such as 1,2-bis-(dimethylsilyl)ethane, and 1,4-bis-(dimethylsilyl)butane.

It will be understood that in the new process it is possible to use, as starting materials, compounds containing more than one grouping of formula

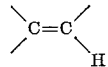

or mixture of compounds containing one or more groupings of this formula, and compounds containing more than one silicon-hydrogen bond, or mixtures of compounds containing one or more silicon-hydrogen bonds. In practice, however, it is generally preferable to use a single definite compound of each category, and more especially a mono-olefin compound and a monohydrogenomonosilane.

When $R_1$ in the olefinic starting material is hydrogen and $R_2$ and $R_3$ are different, it is of course possible to obtain a mixture of isometric products, the proportions of which will depend on the precise nature of $R_2$ and $R_3$.

It is to be pointed out that, even with compounds in which the only reactive groups under the operating conditions are olefinic bonds and silicon-hydrogen bonds, associated reactions may occur, such as addition of hydrogenosilanes to the initial or final olefinic compound, breaking or silicon-hydrogen bonds with at least partial fixation of liberated hydrogen on the unsaturated compounds. The importance of these secondary reactions may vary according to the specific starting materials used and the conditions of the reaction.

As is apparent from the reaction diagram given above, in theory the quantities of starting materials should be such that the number of

bonds is equal to the number of olefinic groups

Nevertheless, it is generally advantageous to work with an excess of the olefinic compound over the silicon compound. More particularly, when a mono-olefin is reacted with a monohydrogenosilane, it is preferred to use from 1 to 10 moles, more especially 1.5 to 2 moles, of olefin for each mole of monohydrogenomonosilane. The proportion of carbon monoxide is generally a large excess as it is convenient to carry out the reaction under pressure of carbon monoxide.

It is possible to work in the presence or absence of a solvent which is inert under the reaction conditions. This solvent can be a hydrocarbon such as cyclohexane or benzene.

As the catalyst, carbonyls of metals of group VIII of the Periodic Table or derivatives of these metals which give the corresponding metal carbonyl under the reaction conditions such as the oxides and salts with organic acids, are used. Suitable compounds include iron pentacarbonyl, nickel tetracarbonyl, and especially dicobalt octacarbonyl. Cobalt acetate is one example of a salt which is converted into a metal carbonyl under the conditions of the reaction. The proportion of catalyst employed can vary within fairly wide limits. Generally, a proportion, expressed as weight of metal, of 0.5 to 10% based on the weight of organosilicon compound used is quite suitable.

The temperature at which the reaction takes place depends on the reactants being employed and may be between 100 and 250° C., and especially between 140 and 200° C.

The pressure used is not critical, but should be chosen to ensure that the metal carbonyl does not dissociate at the temperature used.

If desired, the reaction may be carried out in the presence of molecular hydrogen, which generally increases the speed of the reaction.

The organosilicon compounds produced by the new process have various applications in the industry of organosilicon compounds. They may in particular be employed in polymerisation reactions.

The following examples illustrate the invention.

EXAMPLE 1

Into a 250 cc. stainless steel autoclave equipped with stirring and heating devices, 29 g. (0.25 mole) of triethylsilane, 3.4 g. of dicobalt octacarbonyl (i.e. 4% by weight of Co with respect to the triethylsilane), and 50 cc. of cyclohexane are introduced. The autoclave is flushed with carbon monoxide and 13 g. (0.454 mole) of ethylene are introduced, this bringing the pressure to 13 bars. Carbon monoxide is then injected until a pressure of 137 bars is obtained. The mixture is stirred and heated so that, after 35 minutes, the temperature reaches 170° C. and the pressure 219 bars. The total pressure is then raised to 300 bars by injection of carbon monoxide and the temperature is kept at 170° C. for 3 hours 10 minutes. During this time pressure falls to 258 bars. The autoclave is cooled and degassed and the reaction mass is distilled. After removal of solvent, traces of triethylsilane and various light fractions, 16 g. of a fraction boiling at 74–86° C./15 mm. Hg are collected, which titrates 90% of (1-propenyl)-oxytriethylsilane:

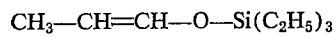

(measured by chromatography).

By rectification using a rotating strip column, a product is separated boiling at 86–87° C./41 mm. Hg, which titrates 99% of (1-propenyl)-oxytriethylsilane

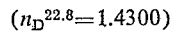

The total yield of (1-propenyl)-oxytriethylsilane is 44% based on the triethylsilane. The constitution of the (1-propenyl)-oxytriethylsilane is confirmed by its infrared spectrum and its nuclear magnetic resonance spectrum (N.M.R.). By hydrogenation in the presence of Raney nickel, propyloxytriethylsilane is obtained, B.P.=61–62° C./13 mm. Hg, $n_D^{20}$=1.4175. [B.P.$_{16}$=64–65° C. and $n_D^{20}$=1.4177, according to Breederveld et al. Rec. Trav. Chim. 72, 711–715 (1963)].

EXAMPLE 2

In an autoclave as described in Example 1, 29 g. (0.25 mole) of triethylsilane, 3.4 g. of dicobalt octacarbonyl, and 50 cc. of cyclohexane are introduced. The autoclave is flushed with carbon monoxide and 43 g. (1.02 mole) of propene are introduced. The pressure is thus raised to 9 bars. Carbon monoxide is then introduced until a pressure of 110 bars is obtained and the mixture is heated with stirring so that a temperature of 165° C. is obtained after 50 minutes. The pressure is then 273 bars. This temperature is maintained for 10 hours, and the pressure then falls to 147 bars. The autoclave is cooled and degassed, and the reaction mass is distilled. 33 g. of a fraction boiling at 80–82° C./20 mm. Hg are obtained which contains 98% of isomeric butenyloxytriethylsilanes (as measured by chromatography), i.e. a yield of 70% based on the triethylsilane. According to the infrared and N.M.R. spectra, the mixture obtained is a mixture of (n-1-butenyl)-oxytriethylsilane and isobutenyloxytriethylsilane.

Hydrogenation of this mixture over Raney nickel gives a 60/40 mixture of n-butyloxytriethylsilane and isobutyloxytriethylsilane identified by infrared spectrography and N.M.R., which confirms that the product obtained by the preceding reaction is a mixture of (n-1-butenyl)-oxytriethylsilane and isobutenyloxytriethylsilane.

EXAMPLE 3

Into the autoclave described in Example 1, 29 g. (0.25 mole) of triethylsilane, 3.4 g. of dicobalt octacarbonyl, 50 cc. of cyclohexane, and 41 g. (0.73 mole) of 1-n-butene are introduced. The operation is carried out as described in Example 1, the temperature being brought in 40 minutes to 170° C. The pressure is then 229 bars. This temperature is maintained for 5½ hours and the pressure is kept between 250 and 300 bars by periodic injection of carbon monoxide. After working up as previously described and distillation, a fraction B.P.=90–120° C./15 mm. Hg is obtained which, accordingly consists of 58% of isomeric pentenyloxytriethylsilanes (as measured by chromatography) i.e. a yield of 27% based on the triethylsilane.

By rectification, a fraction B.P.=91–83° C./16 mm. Hg is obtained, consisting of 99% of (2-methyl-1-butenyl) oxytriethylsilane and (1 - n - pentenyl)oxytriethylsilane, characterised by their N.M.R. and infrared (I.R.) spectra.

EXAMPLE 4

Into the autoclave described in Example 1, 29 g. (0.25 mole) of triethylsilane, 3.8 g. of dicobalt octacarbonyl, and 50 cc. of cyclohexane are introduced. After flushing with carbon monoxide, 14 g. (0.25 mole) of isobutene are added. Carbon monoxide is introduced until the pressure reaches 100 bars, and the mixture is then heated with stirring to 170° C. in 50 minutes. The pressure is brought to 292 bars by injection of carbon monoxide and the temperature is kept at 170° C. for 44 hours. After the usual working up treatments, 13.6 g. of a fraction boiling at 85–115° C./15 mm. Hg are isolated by distillation. 44% (as determined by chromatography) of this fraction consists of a mixture of isopentenyloxytriethylsilane and isopentyloxytriethylsilane, characterised by their I.R. and N.M.R. spectra. By rectification, a product, B.P. 85–86° C./16 mm. Hg and comprising 60% of isopentenyloxytriethylsilane and 40% of isopentyloxytriethylsilane, is obtained.

EXAMPLE 5

Into the autoclave described in Example 1, 29 g. of triethylsilane, 3.4 g. of dicobalt octacarbonyl, 84 g. (1 mole) of 1-hexene are introduced. A carbon monoxide pressure of 100 bars is established and the temperature is raised to 165° C. in 55 minutes. The temperature is kept at 165–175° C. for 4 hours.

After the usual working up treatments, 45.8 g. of a fraction boiling at 108–115° C./15 mm. Hg is separated by distillation. According to analysis by chromatography and the I.R. and N.M.R. spectra, this fraction consists of isomeric heptenyloxytriethylsilanes, hexyltriethylsilane, and a small amount of hexaethyldisiloxane.

Example 6

Into the autoclave described in Example 1, 29 g. of triethylsilane, 3.4 g. of dicobalt octacarbonyl, and 90 g. of diisobutene (4,4,2-trimethyl-1- and 2-pentene, i.e. 0.8 mole) are introduced. An initial carbon monoxide pressure of 160 bars is established in the autoclave. The autoclave is then heated with stirring to bring the temperature to 180° C. in 40 minutes. The pressure is raised to 300 bars by injecting carbon monoxide, and the temperature is kept for 12 hours at 180° C., the pressure being kept at 300 bars by periodic injections of carbon monoxide. The autoclave is cooled and degassed and a light yellow liquid is drawn off. The autoclave is rinsed with 30 g. of diisobutene. By distillation, 39.8 g. of a fraction with a boiling point of 119–135° C./15 mm. Hg are collected, of which, by chromatographic analysis and the infrared and N.M.R. spectra, 56% consists of (3,5,5-trimethyl-1-hexenyl)oxytriethylsilane. The yield of this compound is 35%, based on the triethylsilane.

EXAMPLE 7

Into the autoclave described in Example 1, 29 g. of triethylsilane, 3.4 g. of dicobalt octacarbonyl, and 82 g. (1 mole) of cyclohexene are introduced. An initial carbon monoxide pressure of 150 bars is established in the autoclave, which is then heated with stirring to a temperature of 170° C. in 1 hour, 50 minutes. The pressure is raised to 210 bars, and the temperature and pressure are kept at these values for 15 hours. After the usual working up treatments, the coloured liquid obtained is distilled and 51.7 g. of a fraction boiling at 127–128° C./15 mm. Hg, are obtained, a yield of 87% based on the triethylsilane used. By chromatographic analysis and the infrared and N.M.R. spectra, 85% of this fraction consists of (cyclohexylidenemethoxy) triethylsilane:

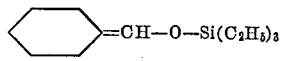

EXAMPLE 8

Into the autoclave described in Example 1, 29 g. of triethylsilane, 3.4 g. of dicobalt octacarbonyl, 5 g. (0.79 mole) of norbornene are introduced. An initial carbon monoxide pressure of 110 bars is established in the autoclave, which is then heated with stirring to 180° C. in 50 minutes. The pressure is then raised to 137 bars. This temperature and pressure are maintained for 4½ hours. After the usual working up treatments, 45.8 g. of a fraction boiling at 135–140° C./15 mm. Hg are obtained, containing (by chromatographic analysis) 85% of [(2,2,1-bicyclo-2-heptylidene)-methoxy]triethylsilane:

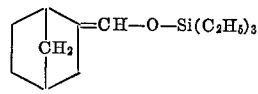

(i.e. a yield of 65%, based on the triethylsilane) and 15% of hexaethyldisiloxane.

The [(2,2,1-bicyclo-2-heptylidene)methoxy]triethylsilane is identified by I.R. and N.M.R. spectrography, and also by reduction to [(2,2,1-bicycloheptyl)methoxy]triethylsilane by hydrogenation of a rectified fraction of the previous mixture.

EXAMPLE 9

Into the autoclave described in Example 1, 36.8 g. (0.25 mole) of diphenylsilane and 4.3 g. of dicobalt octacarbonyl are introduced. After flushing with carbon monoxide, 18 g. (0.64 mole) of ethylene are added bringing the pressure to 38 bars. The pressure is then raised to 138 bars by injection of carbon monoxide and the autoclave is heated with stirring to raise the temperature to 170° C. The pressure is then raised to 200 bars. The temperature is kept at 170° C. and the pressure at 250 bars, by periodic injection of carbon monoxide, for 7 hours. The autoclave is cooled and degassed. After the usual working up treatments of the reaction mass, the liquid obtained is distilled and 22 g. of a fraction, B.P. 140–160° C./0.7 mm. Hg are collected. This is found by chromatography to contain 75% of diphenyl-di-[1-propenyl)-oxy]silane, a yield of 22% based on the diphenylsilane.

By rectification of this fraction, pure diphenyl-di-[(1-propenyl)-oxy]silane, B.P.=116–117° C./0.3 mm. Hg, is obtained, identified by I.R. and N.M.R. spectrography.

EXAMPLE 10

Into the autoclave described in Example 1, 29 g. of triethylsilane, 3.4 g. of dicobalt octacarbonyl, and 82 g. (1 mole) of cyclohexane are introduced. The autoclave is flushed with carbon monoxide and a carbon monoxide pressure of 150 bars is established, followed by a partial hydrogen pressure of 50 bars. The autoclave is heated to 166° C. in 40 minutes, and the pressure rises to 282 bars. The reaction starts suddenly and the pressure falls to 179 bars. The temperature is then raised to 198° C., and the pressure is kept between 200 and 250 bars by injection of carbon monoxide. After a reaction period of 20 minutes, the pressure remains stable. After heating for 1 hour, the autoclave is cooled and degassed and the reaction mass is then distilled. 52.5 g. of a fraction boiling at 130–135° C./17 mm. Hg are collected, the analysis of which by chromatography and the I.R. and N.M.R. spectra shows that it comprises: 5% of hexaethyldisiloxane, 76% of (cyclohexylidene-methoxy)triethylsilane, and 17% of [(1-cyclohexenyl)methoxy]triethylsilane. The combination of the two latter isomers represents a yield of 86% based on the triethylsilane used.

I claim:

1. Process for the preparation of a 1-alkenyloxysilane which comprises reacting a compound containing a silicon-hydrogen bond with an olefin in which a hydrogen atom is bonded directly to an olefinically double bonded carbon atom and with carbon monoxide in the presence of, as catalyst, dicobalt octacarbonyl.

2. Process according to claim 1 in which the reaction is effected in the presence of hydrogen.

3. Process according to claim 1 in which the compound containing a silicon-hydrogen bond has the formula:

in which $R_4$, $R_5$ and $R_6$ are the same or different and each represents hydrogen, alkyl of 1 to 6 carbon atoms, or phenyl.

4. Process according to claim 1 in which the olefin has the formula:

in which $R_1$, $R_2$ and $R_3$ are the same or different and each represents hydrogen, alkyl of 1 to 6 carbon atoms, cycloalkyl of 5 to 6 carbon atoms or phenyl, or $R_1$ is as aforesaid and $R_2$ and $R_3$ together represent a polymethylene chain of 3 or 4 carbon atoms.

5. Process according to claim 1 in which the reaction is carried out at 100 to 250° C. under a pressure sufficient to prevent dissocation of the metal carbonyl.

6. Process according to claim 1 in which the proportion of catalyst is 0.5 to 10% of the weight of the silicon compound starting material.

7. Process according to claim 1 in which 1.5 to 2 moles of olefin are reacted with each mole of the silicon-containing starting material.

8. Process for the preparation of a 1-alkenyloxysilane of formula:

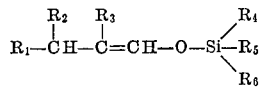

in which $R_1$, $R_2$ and $R_3$ are each hydrogen, alkyl of 1 to 6 carbon atoms, cycloalkyl of 5 to 6 carbon atoms, or phenyl, or $R_1$ is as aforesaid and $R_2$ and $R_3$ together represent a polymethylene chain of 3 to 4 carbon atoms, and $R_4$, $R_5$ and $R_6$ are each hydrogen, alkyl of 1 to 6 carbon atoms, or phenyl, which comprises contacting one molecular proportion of a silicon-containing compound of the formula:

where $R_4$, $R_5$ and $R_6$ are as hereinbefore defined, with 1.5 to 2 molecular proportions of an olefin of formula:

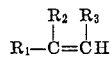

where $R_1$, $R_2$ and $R_3$ are as hereinbefore defined, at 100° to 250° C. in the presence of, as catalyst, 0.5 to 10%, by weight of the silicon-containing compound, dicobalt octacarbonyl, under a pressure of carbon monoxide sufficient to prevent dissociation of the metal carbonyl.

9. Process according to claim 8 in which the reaction is effected in the presence of hydrogen under pressure.

References Cited

UNITED STATES PATENTS

| | | | |
|---|---|---|---|
| 2,917,530 | 12/1959 | Bailey | 260—448.2 |
| 2,920,092 | 1/1960 | Bailey | 260—448.2 |
| 3,271,362 | 9/1966 | Chalk et al. | 260—46.5 XR |

TOBIAS E. LEVOW, *Primary Examiner.*

J. P. PODGORSKI, *Assistant Examiner.*